July 10, 1951 H. F. SCHOEMEHL 2,560,483
ERASING SYSTEM FOR MAGNETIC RECORDERS
Filed April 28, 1950
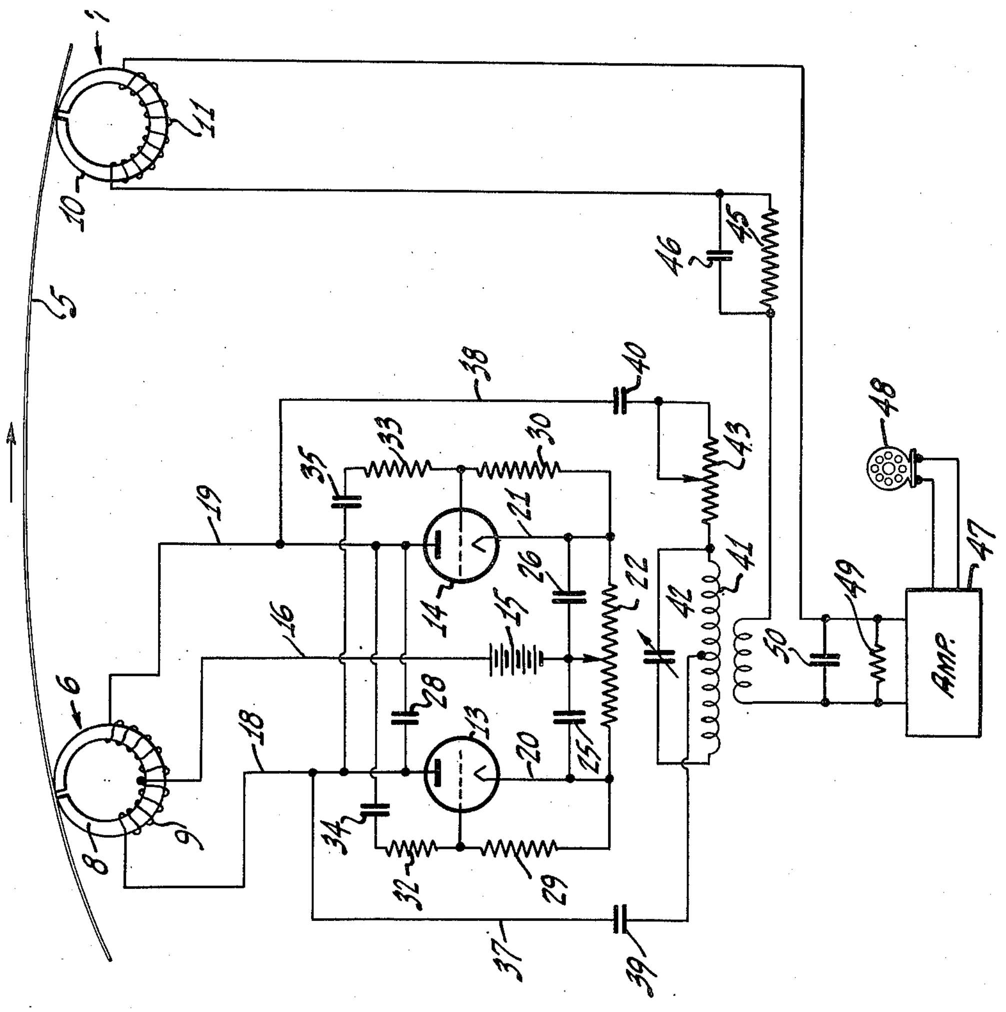
HENRY F. SCHOEMEHL,
INVENTOR.
BY Orel R. Goshaw
ATTORNEY Patented July 10, 1951 2,560,483

UNITED STATES PATENT OFFICE 2,560,483

ERASING SYSTEM FOR MAGNETIC RECORDERS

Henry F. Schoemehl, Seelyville, Ind., assignor to Radio Corporation of America, a corporation of Delaware Application April 28, 1950, Serial No. 158,870

7 Claims. (Cl. 179—100.2)

This invention relates to magnetic sound recording and reproducing systems, and particularly to a system whereby the maximum in signal-to-noise ratio is obtainable.

It is well-known that, in present-day magnetic recording, a high frequency bias current is supplied to the recording head, this current being modulated by the signal currents impressed on the head. Since the form of the head includes a core with windings thereon, stray magnetic fields are present in and around the recording head. These fields get into the tape on the record portion thereof and increase the reproduced tape noise. By the use of a push-pull oscillator in which the direct current used for generating the bias currents is balanced in the head, these stray fields are reduced to a minimum. The balance is obtained by balancing the direct current as applied to the anodes of the push-pull oscillator tubes. An erase head functions just prior to the record head, the windings of the erase head being used as the oscillator tank coil. With such a balanced system, the noise induced in the tape, due to the bias, is reduced from both the even harmonic elimination standpoint and from the stray field standpoint. Although the oscillator and stray field balances may not occur at exactly the same point, a compromise is obtainable between the two conditions.

The principal object of the invention, therefore, is to reduce the noise from a reproduced magnetic record by eliminating noise components in the record during recording.

Another object of the invention is to provide an impoved magnetic recording system.

A further object of the invention is to provide an improved method of and system for recording a magnetic record, whereby the erase head coils provide the oscillator tank inductance.

A still further object of the invention is to provide a cathode-balanced push-pull oscillator to reduce magnetizable tape noise.

Although the novel features which are believed to be characteristic of this invention will be pointed out with particularity in the appended claims, the manner of its organization and the mode of its operation will be better understood by referring to the following description, read in conjunction with the accompanying drawing, forming a part hereof, in which the single figure is a schematic drawing of the system embodying the invention.

Referring now to the drawing, a magnetic tape 5 is shown advancing in the direction of the arrow past a magnetic erase head 6 and a recording head 7. The erase head has a core 8 and a winding 9, while the recording head has a core 10 and a winding 11. A pair of oscillator tubes 13 and 14 may be supplied with anode potential from any suitable source, such as a battery 15. The anode circuits are from the battery 15, over conductor 16, dividing between each half of the coil 9, and then to the anodes of the tubes 13 and 14, over conductors 18 and 19, respectively. The remainders of the anode circuits are over conductors 20 and 21, balancing resistor 22 with its slider 23, and then to the battery 15. The balancing resistor 22 is by-passed by condensers 25 and 26.

To complete the push-pull oscillator circuit, a tuning condenser 28 is connected between the two anodes of the tubes 13 and 14, while grid resistors 29 and 30 are connected between the grids of the tubes and the ends of balancing resistor 22. Feedback resistors 32 and 33 are provided, along with blocking and feedback condensers 34 and 35. The oscillator output is fed over conductors 37 and 38 and blocking condensers 39 and 40 to the secondary of a transformer 41. This transformer has a variable condenser 42 across its secondary, which, together with potentiometer 43, controls the bias applied to the recording head 7.

As thus far described, the erase head is supplied with bias current directly from the anodes of tubes 13 and 14, the direct current passing through two sections of coil 9 being balanced out by the slider 23. The alternating current balance may coincide with the direct current balance, and generally does, but, if not, a compromise may be reached between the two balance points.

Referring to the remaining portion of the circuit, the secondary of transformer 41 is connected with the winding 11 of the recording head 7, over an equalizer composed of a resistor 45 and a condenser 46 in parallel, for the purpose of equalizing the high end of the frequency spectrum as applied to the recording head 7. To eliminate the bias current from feeding into the input amplifier 47, fed by a microphone 48, an equalizer composed of a resistor 49 and condenser 50 is connected across the output of the amplifier.

Thus, to record, the tape is advanced in the direction shown by the arrow, and, as it passes the gap in the core 8 of the erase head 6, any stray magnetism or prior signal magnetism is erased. After erasing, a new signal is applied at the gap of core 10 of the recording head 7. As mentioned above, by balancing the direct current and alternating current components in the two halves of the winding 9, a maximum in signal-to-noise ratio is obtained from the reproduced record on the tape or film.

I claim:

1. A magnetic sound recording system comprising a magnetizable record medium, an erase head having a two-section winding thereon, a push-pull oscillator having a pair of tubes with anodes, cathodes, and grids, said anodes being connected to said cathodes through the sections of said winding, a source of direct current for said anodes, means for balancing the direct and alternating current through the sections of said windings, a recording head, and means for feeding said recording head from said oscillator.

2. A magnetic sound recording system in accordance with claim 1, in which said first mentioned means is a voltage divider between said cathodes and said source of direct current.

3. A magnetic sound recording system in accordance with claim 1, in which said last mentioned means is a parallel circuit from said anodes, and a transformer connected in said circuit and in the circuit to said recording head.

4. A system for eliminating stray magnetic fields in a magnetizable record medium comprising a magnetic erasing head having two winding sections, means for applying an erasing current to said two winding sections of said magnetic erasing head, and means for balancing the currents to said winding sections.

5. A system for magnetic recording, in which stray magnetic fields are eliminated, comprising a magnetic erasing head having two winding sections, means for applying a push-pull generated erasing current to said two winding sections of said magnetic erasing head in contact with a magnetizable record medium, means for balancing the currents passing through said winding sections, and means for recording a signal on said medium subsequently to the application of said erasing current.

6. A magnetic sound recording system comprising a magnetizable medium, a push-pull oscillator having a tuning condenser for generating erasing and biasing currents, an erasing head having a winding in two sections, a pair of electronic vacuum tubes, each of which is connected to a section of said winding, the inductance of said sections and said condenser determining the frequency of oscillation of said oscillator, a source of direct current potential for said tubes, and means for balancing the current from said source passing through the sections of said winding.

7. A magnetic sound recording system in accordance with claim 6, in which a recording head is provided, together with means for impressing a portion of said oscillator current on said recording head.

HENRY F. SCHOEMEHL.

No references cited.